United States Patent
Tsui

(10) Patent No.: US 8,509,770 B2
(45) Date of Patent: Aug. 13, 2013

(54) METHOD, COMMUNICATION DEVICES, AND STORAGE DEVICE FOR CONTROLLING COMMUNICATION

(75) Inventor: Yuan-Mao Tsui, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 155 days.

(21) Appl. No.: 13/077,130

(22) Filed: Mar. 31, 2011

(65) Prior Publication Data

US 2011/0263248 A1    Oct. 27, 2011

Related U.S. Application Data

(60) Provisional application No. 61/327,725, filed on Apr. 26, 2010.

(30) Foreign Application Priority Data

Jan. 7, 2011 (TW) .............................. 100100721 A

(51) Int. Cl.
*H04W 4/00* (2009.01)

(52) U.S. Cl.
USPC .................. 455/435.1; 455/422.1; 455/456.1

(58) Field of Classification Search
USPC ............. 455/422.1, 432.1, 433, 435.1, 456.1, 455/457, 466
See application file for complete search history.

(56) References Cited

U.S. PATENT DOCUMENTS

| 6,292,666 B1 * | 9/2001 | Siddiqui et al. ............ 455/456.4 |
| 2004/0014473 A1 | 1/2004 | Ando |

FOREIGN PATENT DOCUMENTS

| CN | 1480004 A | 3/2004 |
| CN | 1917692 A | 2/2007 |
| EP | 1073304 A1 | 1/2001 |
| EP | 1916832 A1 | 4/2008 |

* cited by examiner

*Primary Examiner* — Temica M Beamer
(74) *Attorney, Agent, or Firm* — Rabin & Berdo, P.C.

(57) ABSTRACT

A method, a communication device, and a storage device for controlling communication are provided. The communication controlling method comprises the following steps. A telephone number of a receiver is provided, wherein the telephone number is corresponding to a first area. A second area where the receiver is located is provided. Whether the first and second areas are the same is determined. If the first and second areas are not the same, then a warning message is displayed.

12 Claims, 5 Drawing Sheets

METHOD, COMMUNICATION DEVICES, AND STORAGE DEVICE FOR CONTROLLING COMMUNICATION

This application claims the benefit of a provisional application Ser. No. 61/327,725, filed Apr. 26, 2010, and Taiwan application Serial No. 100100721, filed Jan. 7, 2011, the subject matter of which are incorporated herein by reference.

BACKGROUND OF THE INVENTION

1. Field of the Invention

The invention relates in general to a method, a communication device, and a storage device for controlling communication, and more particularly to a method, a communication device, and a storage device for controlling roaming communication.

2. Description of the Related Art

Under the current trend of globalization, international business activities or tourism activities are getting more and more popular, and many people need to travel domestically or internationally for their business or tourism. Thus, when the user makes a phone call, quite often the user cannot make sure whether the receiver stays domestically or has gone overseas. If the user makes a domestic phone call but the receiver is already overseas, international roaming rate applies. In general, international roaming rate is very expensive and this is quite a nuisance to both the caller and the receiver.

SUMMARY OF THE INVENTION

The invention is directed to a method, a communication device, and a storage device for controlling communication. A comparison between the original area corresponding to the telephone number and the actual location of the receiver is made for determining whether the receiver is in the original area corresponding to the number or other areas.

According to a first aspect of the invention, a communication controlling method is provided. The communication controlling method comprises the following steps. A telephone number of a receiver is provided, wherein the telephone number is corresponding to a first area. A second area where the receiver is located is provided. Whether the first and second areas are the same is determined. If the first and second areas are not the same, then a warning message is displayed.

According to a second aspect of the invention, a communication device is provided. The communication device comprises a storage unit, a processing unit, and a display unit. The storage unit stores a telephone number of a receiver and a second area where the receiver is located. The telephone number is corresponding to a first area. The processing unit determines whether the first and second areas are the same. The display unit is controlled by the processing unit to display a warning message if the first and second areas are not the same.

According to a third aspect of the invention, a storage device is provided. The storage device loads in a computer program for performing the following steps. A telephone number of a receiver is provided, wherein the telephone number is corresponding to a first area. A second area where the receiver is located is provided. Whether the first and second areas are the same is determined. If the first and second areas are not the same, then a warning message is displayed.

The above and other aspects of the invention will become better understood with regard to the following detailed description of the preferred but non-limiting embodiment(s). The following description is made with reference to the accompanying drawings.

DETAILED DESCRIPTION OF THE INVENTION

First Embodiment

Figure 1:
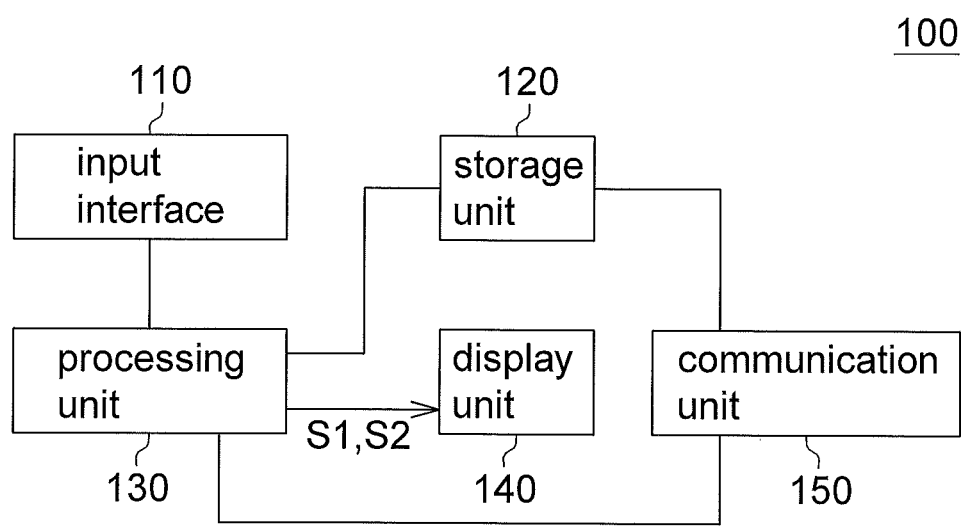
FIG. 1 shows a block diagram of a communication device according to a first embodiment.

Referring to FIG. 1, a block diagram of a communication device 100 according to a first embodiment is shown. The communication device 100 comprises an input interface 110, a storage unit 120, a processing unit 130, a display unit 140, and a communication unit 150. The input interface 110 is used for inputting various types of information, and may be realized by various interfaces or devices, which may capable of inputting various types of information, such as a keyboard, a touch panel, and a touch screen. The storage unit 120 is used for storing various types of information, and may be realized by various types of devices, which are capable of storing various types of information, such as a memory, a hard disc, a memory card, or realized by a remote end accessing device. The processing unit 130 is used for performing various computation and control procedures, and may be realized by such as a micro-processing chip, a firmware circuit, and a storage device storing a plurality of programming codes. The display unit 140 is used for displaying various types of information, and may be realized by such as a liquid crystal display panel, a touch screen, an organic light emitting diode display panel, and an electronic paper. The communication unit 150 is used for transmitting audio, text or video information, and may be realized by such as a combination of an antenna and a radio frequency chip.

Figure 2:
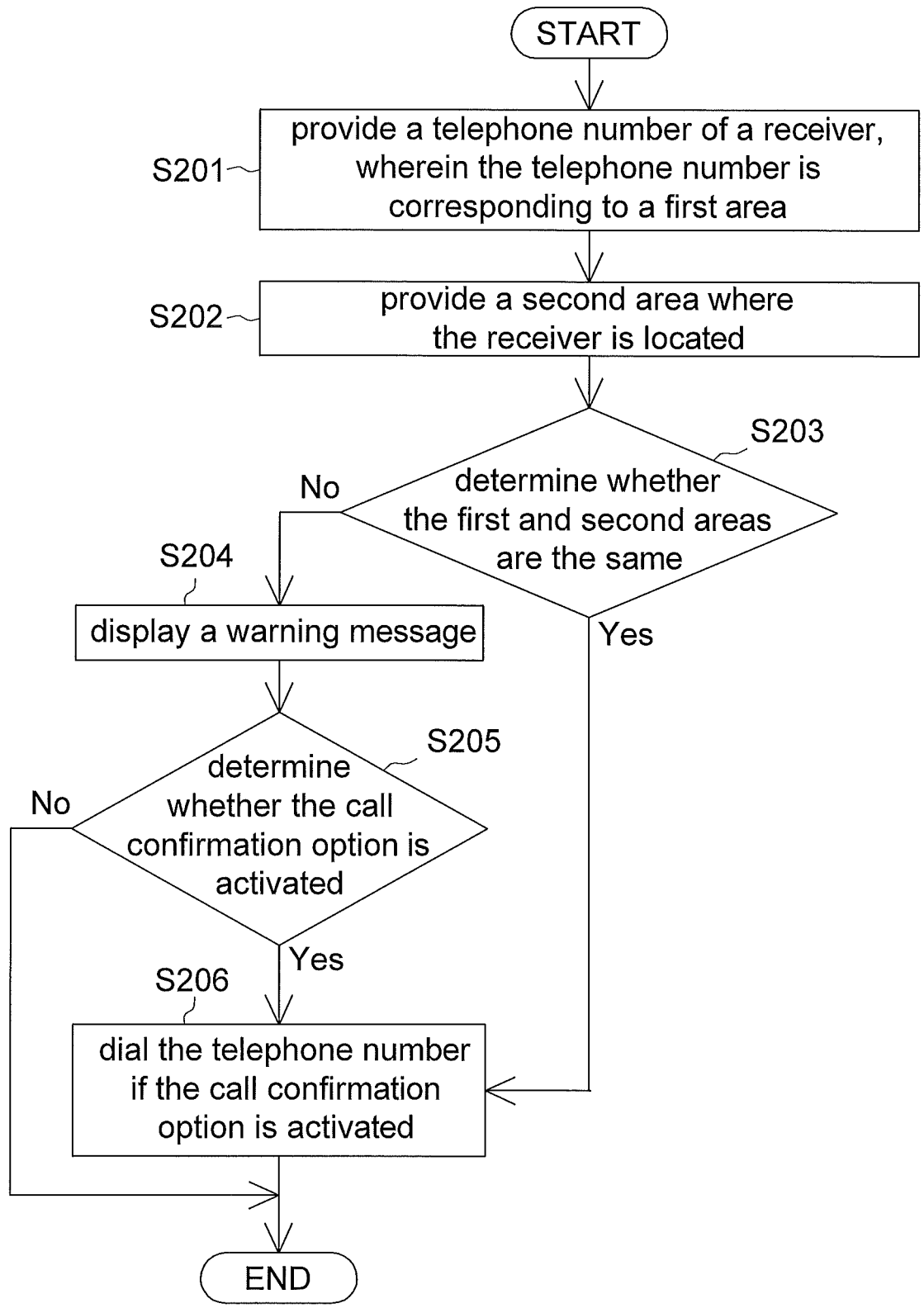
FIG. 2 shows a flowchart of a communication controlling method according to a first embodiment.

Referring to FIG. 2, a flowchart of a communication controlling method according to a first embodiment is shown. The operations of the above elements and the procedures of the communication controlling method of the present embodiment of the invention are elaborated below with an accompanying flowchart. However, anyone who is skilled in the technology of the invention will understand that the communication controlling method of the present embodiment of the invention is not limited to being used in the communication device 100 of FIG. 1, and the sequence and procedures exemplified in the flowchart are not for limiting the invention. Moreover, the communication controlling method of FIG. 2 may be implemented by a computer program, which may be loaded in a storage device. The storage device may be realized by such as a micro-processing chip, a firmware circuit, a storage device, and a notebook computer capable of storing computer programs.

Firstly, the method begins at step S201, the user provides a telephone number of a receiver (not illustrated) via an input interface 110, wherein the area corresponding to the telephone number is defined as a first area, which covers a specific range such as one or several cities, a region of a country, a country, and a number of adjacent countries. For example, when the range of the area is a country, (the national code for Taiwan is "+886", and the national code for the United States is "+1"), the corresponding country of the telephone number (that is, the area corresponding to the telephone number) can be identified from the country codes (for example the national code "+886" and "+1").

Next, the method proceeds to step S202, a second area where the receiver is located is provided. In the present step, the second area may be pre-stored in the storage unit 120, for example, the user may input the receiver location to the receiver's contact data. Or, the second area may be obtained by retrieving the receiver's calendar information from the communication device or the calendar of the network application program, then the processing unit 130 retrieves the second area from the storage unit 120. Or, the second area may be instantaneously obtained by detecting the receiver's current location detected with the communication unit 150 and then performing the location sharing function. The location sharing application program is such as a network service and an application program capable of sharing and updating its own location, or an application program capable of sharing information with other users. Or, the second area may be obtained by inquiring the receiver via the network. In the present embodiment of the invention, the storage unit 120 may store the mapping tables between various types of geographic information and area information, so that the corresponding area may be obtained when obtaining various types of geographic information. Examples of the mapping table comprise a mapping table between latitude/longitude and area information, a mapping table between base stations and area information, a mapping table between WiFi hotspots and area information, a mapping table between national codes and countries, a mapping table between telephone area numbers and area information, a mapping table between addresses and area information, and a mapping table between electronic map location and area information, and no specific restriction is imposed here.

Then, the method proceeds to step S203, the processing unit 130 determines whether the first and second areas are the same. If the first area and second areas are the same, then the method directly proceeds to step S206. If the first and second areas are not the same, then the method proceeds to step S204.

In an embodiment, steps S202 and S203 may be halted until the user presses the call key or performs call function after the user has inputted and provided a telephone number of a receiver. In another embodiment, steps S202 and S203 may be performed at the same time when the user inputs and provides the receiver's telephone number. For example, when the user inputs and provides the receiver's telephone number, the contact data is compared at the same time so as to locate the corresponding contact person and retrieve the second area of the receiver's contact person from the corresponding contact data for performing steps S202 and S203.

Figure 3:
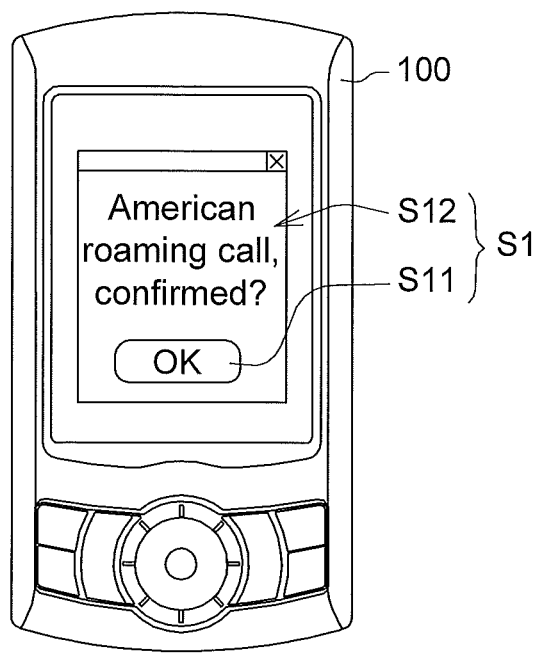
FIG. 3 shows a warning message.

In step S204, the processing unit 130 controls the display unit 140 to display a warning message S1. Referring to FIG. 3, a warning message S1 is shown. The content of the warning message S1 comprises a call confirmation option S11 and a relevant information S12. The relevant information S12 is for example texts which remind the user that the call will be through roaming (such as international roaming) communication system, or texts describing the receiver's second area such as country.

Next, the method proceeds to step S205, whether the call confirmation option S11 is activated is determined by the processing unit 130. If the call confirmation option S11 is activated, then the method proceeds to step S206. If the call confirmation option S11 is not activated, the window of the warning message S1 is closed, a reject option (not illustrated in the diagram) is activated, or a hang-up key is activated, then the method terminates.

In step S206, the processing unit 130 controls the communication unit 150 to dial the telephone number.

Through the above steps, user can immediately understand whether the receiver has left the corresponding area of the telephone number when the caller is about to make a phone call to the receiver. If the user finds that the receiver has left the corresponding area of the telephone number and no more stays in the area that the user thought to be, the user may choose not to dial the telephone number, lest one party or both parties has to pay expensive roaming fee. If the user still wants to make the phone call despite it is a roaming call, the user will be aware of the roaming call and control the call time accordingly.

Figure 4:
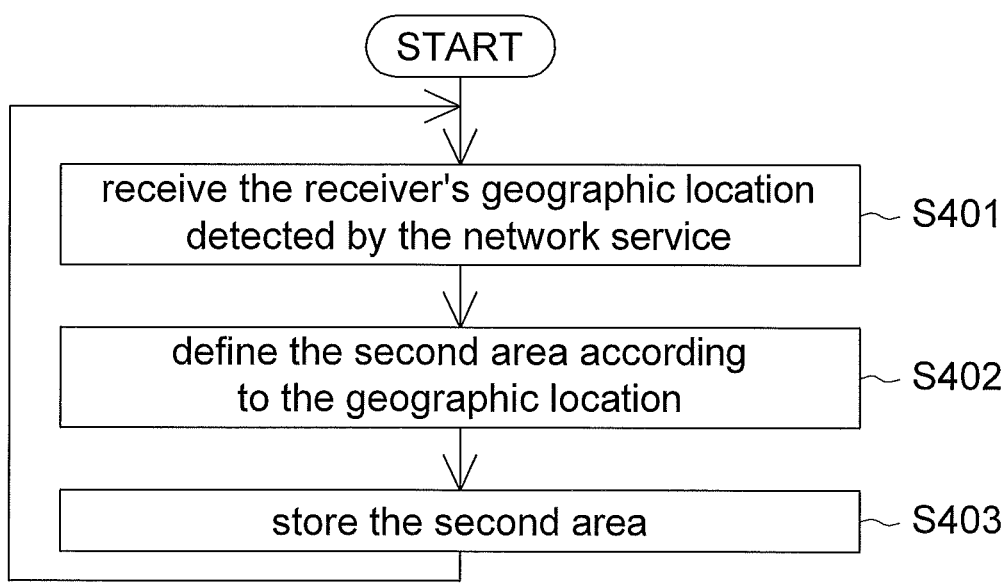
FIG. 4 shows a flowchart of obtaining the second area.

Referring to FIG. 4, a flowchart of obtaining the second area is shown. In the present embodiment of the invention, the receiver's second area is pre-stored in the storage unit 120, so before the user inputs the telephone number, the receiver's second area may be obtained through the following steps and pre-stored in the storage unit 120.

In general, when the receiver logs in a particular network service (websites such as Google Latitude, Google Map, Facebook), the server of the network service may detect a geographic location in which the receiver logs in the network service. In step S401, the communication unit 150 of the communication device 100 may receive the receiver's geographic location detected by the network service.

Next, the method proceeds to step S402, the processing unit 130 of the communication device 100 defines the second area according to the above geographic location.

Then, the method proceeds to step S403, the second area is stored in the storage unit 120 by the processing unit 130.

To assure the accuracy of the receiver's second area, steps S401~S403 may be repeated each predetermined time for updating the second area stored in the storage unit 120 or the second area in the storage unit 120 may be updated instantaneously.

Thus, the receiver's second area may be pre-stored in the storage unit 120. When the communication device 100 performs step S202, the receiver's second area may be directly retrieved from the storage unit 120 without going through series of steps, so that the speed of information processing is increased.

Second Embodiment

Figure 5:
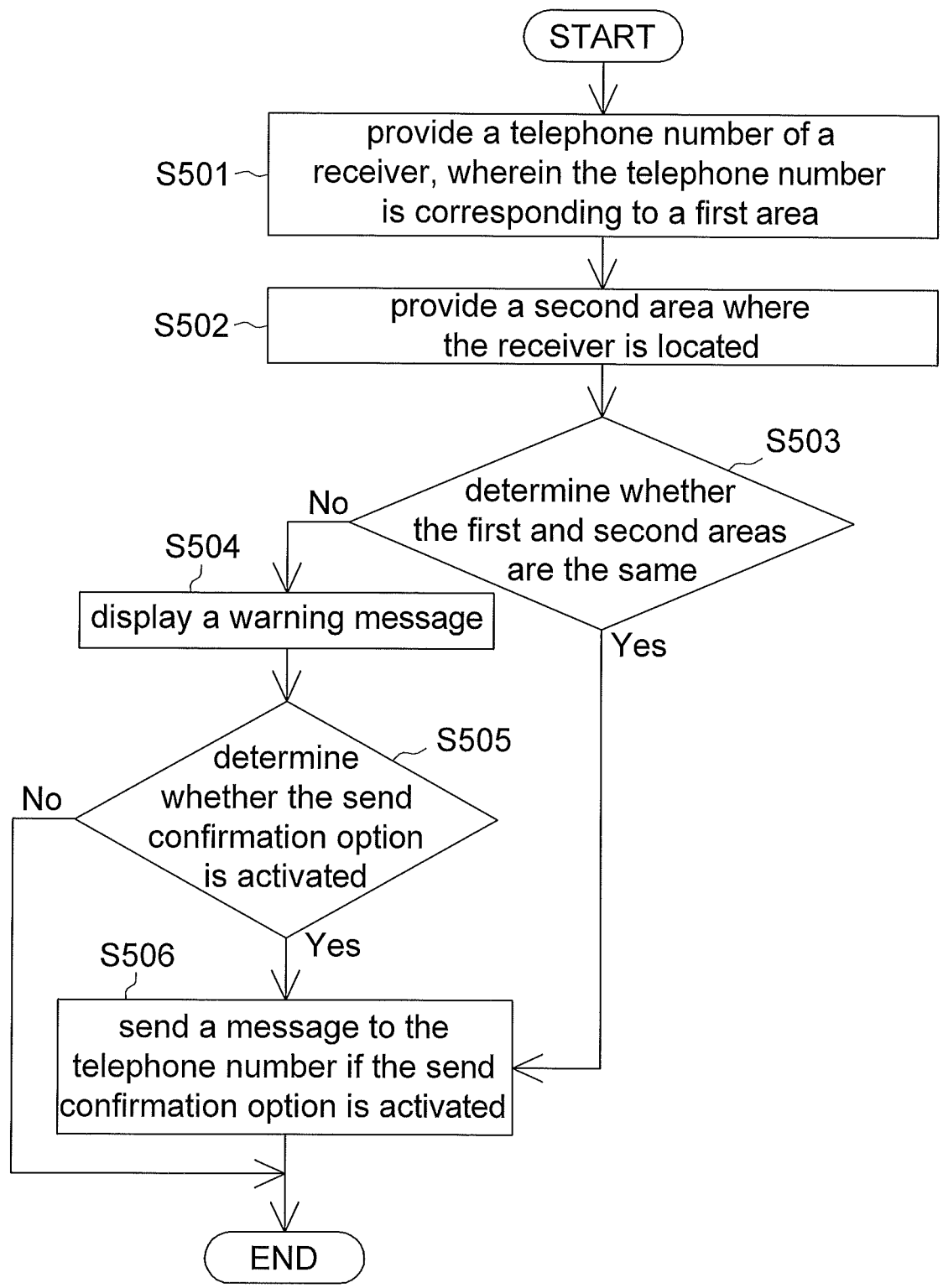
FIG. 5 shows a flowchart of a communication controlling method according to a second embodiment.

Referring to FIG. 5, a flowchart of a communication controlling method according to a second embodiment is shown. The communication controlling method of the present embodiment of the invention is different from the communication controlling method of the first embodiment in that steps S505 and S506 replace steps S205 and S206 for controlling the transmission of roaming message (such as international roaming). Steps S501~S504 are similar to steps S201~S204 of the first embodiment, and the similarities are not repeated here.

Figure 6:
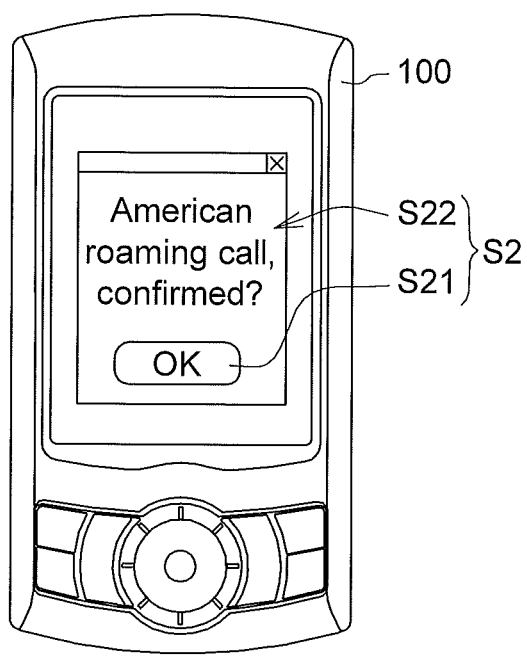
FIG. 6 shows a warning message.

As indicated in FIG. 5, after the communication controlling method proceeds to step S504, the processing unit 130 controls the display unit 140 to display a warning message S2. Referring to FIG. 6, a warning message S2 is shown. The content of the warning message S2 comprises a send confirmation option S21 and a relevant information S22. The relevant information S22 is such as texts which remind the user that the call will be through roaming (such as international roaming) communication system, or texts describing the receiver's second area such as country.

Next, the method proceeds to step S505, whether the call confirmation option S21 is activated is determined by the processing unit 130. If the call confirmation option S11 is activated, then the method proceeds to step S506. If the call confirmation option S21 is not activated, then the method terminates.

In step S506, the processing unit 130 controls the communication unit 150 to send a message.

Despite the above embodiments are divided into the first embodiment and the second embodiment, the first embodiment and the second embodiment can be concurrently implemented on the same communication device 100. The first embodiment is adopted when the user performs a phone calling procedure (such as inputting a telephone number to the main frame and pressing a call key; or selecting a contact person from the telephone book and making a call). The second embodiment is adapted when the user performs a message sending procedure (such as inputting text to the message editing window and pressing the send key; or selecting a contact person from the telephone book, pressing the message editing key, and sending the message).

While the invention has been described by way of example and in terms of the embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A communication controlling method, comprising:
   providing a telephone number of a receiver, wherein the telephone number is corresponding to a first area;
   receiving a geographic location of the receiver, having been detected by a network service into which the receiver logs in, wherein the network service is capable of updating and sharing the current location of the receiver;
   defining a second area according to the detected geographic location;
   storing the second area, and repeating the steps of receiving the detected geographic location, defining the second area, and storing the second area in successive predetermined equal time intervals;
   providing the second area where the receiver is located;
   determining whether the first and second areas are the same; and
   displaying a warning message if the first and second areas are not the same.

2. The communication controlling method according to claim 1, wherein the warning message comprises a call confirmation option, and the communication controlling method further comprises:
   determining whether the call confirmation option is activated; and
   dialing the telephone number if the call confirmation option is activated.

3. The communication controlling method according to claim 1, wherein the warning message comprises a send confirmation option, and the communication controlling method further comprises:
   determining whether the send confirmation option is activated; and
   sending a message via the telephone number if the send confirmation option is activated.

4. The communication controlling method according to claim 1, wherein the steps of receiving the detected geographic location, defining the second area, and storing the second area are performed prior to the step of providing the telephone number.

5. The communication controlling method according to claim 1, wherein in the step of storing the second area, the second area is stored in a storage unit, and in the step of providing the second area, the second area is retrieved from the storage unit.

6. The controlling method according to claim 1, wherein the warning message comprises the second area.

7. A storage device loaded in an electronic device for performing the following steps of:
   providing a telephone number of a receiver, wherein the telephone number is corresponding to a first area;
   receiving a geographic location of the receiver, having been detected by a network service into which the receiver logs in, wherein the network service is capable of updating and sharing the current location of the receiver;
   defining a second area according to the detected geographic location;
   storing the second area, wherein the steps of receiving the detected geographic location, defining the second area, and storing the second area are repeated successively at predetermined equal time intervals;
   providing the second area where the receiver is located;
   determining whether the first and second areas are the same; and
   displaying a warning message if the first and second areas are not the same.

8. A communication device, comprising:
   a communication unit for receiving a geographic location of a receiver, the geographic location having been detected by a network service into which the receiver logs in, and defining a second area according to the detected geographic location, wherein the network service is capable of updating and sharing the current location of the receiver;
   a storage unit for storing a telephone number of the receiver and the second area where the receiver is located, wherein the telephone number is corresponding to a first area; wherein the communication unit and the storage unit perform operations of receiving the geographic location, defining the second area and storing the second area repeatedly in successive predetermined equal time intervals;
   a processing unit for determining whether the first and second areas are the same; and
   a display unit, controlled by the processing unit, for displaying a warning message if the first and second areas are not the same.

9. The communication device according to claim 8, wherein the warning message comprises a call confirmation option, and the processing unit further determines whether the call confirmation option is activated, and if the call confirmation option is activated, then the processing unit controls the communication unit to dial the telephone number.

10. The communication device according to claim 8, wherein the warning message comprises a send confirmation option, and the processing unit further determines whether the send confirmation option is activated, and if the send confirmation option is activated, then the determination unit controls the communication unit to send a message via the telephone number.

11. The communication device according to claim 10, wherein the message comprises a text message and a multimedia message.

12. The communication device according to claim 8, further comprising:
- an input interface for a user to input the receiver's telephone number, wherein the communication unit and the storage unit perform the operations of receiving the geographic location, defining the second area and storing the second area before the input interface is used to input the telephone number.

* * * * *